US012758999B2

(12) United States Patent
Deschamps et al.

(10) Patent No.: US 12,758,999 B2
(45) Date of Patent: Oct. 13, 2026

(54) ASSEMBLY FOR DISPENSING A FLUID PRODUCT

(71) Applicant: APTAR FRANCE SAS, Le Neubourg (FR)

(72) Inventors: Olivier Deschamps, Romilly sur Andelle (FR); Diego Espinoza, Oissel (FR); Mathilde Blondel, Louviers (FR); Naoufal Rebla, Le Petit Quevilly (FR)

(73) Assignee: APTAR FRANCE SAS, Le Neubourg (FR)

( * ) Notice: Subject to any disclaimer, the term of this patent is extended or adjusted under 35 U.S.C. 154(b) by 39 days.

(21) Appl. No.: 18/695,121

(22) PCT Filed: Sep. 26, 2022

(86) PCT No.: PCT/FR2022/051798

§ 371 (c)(1),
(2) Date: Mar. 25, 2024

(87) PCT Pub. No.: WO2023/047067

PCT Pub. Date: Mar. 30, 2023

(65) Prior Publication Data

US 2025/0144653 A1 May 8, 2025

(30) Foreign Application Priority Data

Sep. 27, 2021 (FR) ....................................... 2110160

(51) Int. Cl.
*B05B 11/02* (2023.01)
*B05B 11/00* (2023.01)

(52) U.S. Cl.
CPC .......... *B05B 11/02* (2013.01); *B05B 11/0008* (2013.01); *B05B 11/0035* (2013.01); *B05B 11/0037* (2013.01)

(58) Field of Classification Search
CPC . B05B 11/02; B05B 11/0008; B05B 11/0035; B05B 11/0037
See application file for complete search history.

(56) References Cited

U.S. PATENT DOCUMENTS 4,962,868 A * 10/1990 Borchard ................ B05B 11/02 222/49
5,547,131 A 8/1996 Brace
(Continued)

FOREIGN PATENT DOCUMENTS

EP 2 939 700 A1 11/2015
WO 00/71263 A1 11/2000
(Continued)

OTHER PUBLICATIONS

Machine translation of WO-2015104511-A1.*
(Continued)

*Primary Examiner* — Jeremy Carroll
(74) *Attorney, Agent, or Firm* — Sughrue Mion, PLLC

(57) ABSTRACT

An assembly for dispensing a fluid product having a tank and a piston sliding in the tank, a sampling needle being attached to the tank for drawing a fluid product into the tank, a removable spray head being assembled on the tank, around the sampling needle, for spraying the fluid product. The spray head has an insert arranged upstream of a dispensing port, the spray head, when assembled on the tank, being axially movable between transport and use positions, the assembly has a guide mechanism for guiding the spray head when it is assembled in its transport position and/or when it is moved into its use position, a first locking mechanism for holding the spray head in its transport position, and a second locking mechanism for holding the spray head in its use position.

18 Claims, 4 Drawing Sheets

(56) References Cited

U.S. PATENT DOCUMENTS

| | | | | |
|---|---|---|---|---|
| 11,065,392 | B1 | 7/2021 | Hoffer et al. | |
| 2005/0098172 | A1 | 5/2005 | Anderson | |
| 2021/0354152 | A1 * | 11/2021 | Kreutzmann | B05B 11/0027 |

FOREIGN PATENT DOCUMENTS

| | | | | | |
|---|---|---|---|---|---|
| WO | WO-2015104511 | A1 * | 7/2015 | | B05B 11/1038 |
| WO | 2021/094683 | A1 | 5/2021 | | |

OTHER PUBLICATIONS

English Translation of International Preliminary Report on Patentability issued Dec. 22, 2023 in International Application No. PCT/FR2022/051798.

International Search Report issued Dec. 22, 2022 in International Application No. PCT/FR2022/051798.

* cited by examiner

ASSEMBLY FOR DISPENSING A FLUID PRODUCT

CROSS-REFERENCE TO RELATED APPLICATIONS

This is a National Stage of International Application No. PCT/FR2022/051798 filed Sep. 26, 2022, claiming priority based on French Patent Application No. 2110160 filed Sep. 27, 2021.

The present invention relates to an assembly for dispensing a fluid product.

Fluid product dispensing devices are well known. They generally comprise a tank, dispenser means, and a dispenser head. The dispenser head can be a spray head, for example, of the nasal type. These spray heads generally comprise two parts, namely a body forming the head and a part forming the sprinkler, i.e. the part which creates the spray by making the fluid product swirl when it is dispensed. In the case of an external sprinkler, a small sleeve is inserted through the outside into the downstream end of the body to define with it, said spray profile. In the case of a so-called internal sprinkler, it is an insert inserted through the inside of the head which engages with the end wall of the body to define the spray profile. In both cases, the spray profiles generally comprise a plurality of non-radial channels, in particular three, formed either in the bottom wall of the head, or on the sleeving forming an external sprinkler, or on the insert forming an internal sprinkler. Generally, the spray heads are assembled on pump piston rods or valves for guiding the product, which is dispensed outside of the pump or of the valve, towards the spray port. However, it has also been proposed to arrange a spray head directly on the outlet of a syringe-type tank to spray the content of said syringe, rather than injecting it through a needle. Document WO0071263 describes such an arrangement. Once again, these spray heads are still made with two or more parts that are assembled together. This implementation prevents, in particular, the use of these syringes in drawing mode. In particular, a syringe with a spray head does not enable the drawing mode that is typical of syringes, for example, for drawing a fluid product from a sampling tank. Moreover, a syringe with a needle does not enable a spray of the fluid product when it is dispensed.

Document WO2015104511 describes an assembly for dispensing a fluid product comprising a one-piece part forming a tank and sampling needle, intended to reconstitute a fluid product by first mixing a powder with a solvent, then by spraying said mixture in the form of a nasal spray, in one or two doses, through a spray head assembled around the sampling needle. This assembly has disadvantages. Thus, the tip of the sampling needle is either not protected, when the spray head is not assembled, or stressed in said assembled spray head. In both cases, there is a risk of damage when the assembly is transported, before use, in particular in case of the assembly falling. In addition, the one-piece embodiment of the tank with the needle can be complicated, and requires the same material to be used, which is not always desirable.

Documents U.S. Pat. No. 5,547,131, U.S. Ser. No. 11/065,392, US2005098172 and EP2939700 describe other devices of the prior art.

The present invention aims to provide an assembly for dispensing a fluid product which does not reproduce the abovementioned disadvantages.

The present invention in particular aims to provide an assembly for dispensing a fluid product, which guarantees the integrity of the tip of the needle before use, in particular when it is transported and stored.

The present invention also aims to provide such an assembly for dispensing a fluid product, which makes it possible to optimise the materials, in particular to produce the tank and the sampling needle.

The present invention also aims to provide an assembly for dispensing a fluid product, which is simple and inexpensive to manufacture and to assemble, and which can operate both in drawing mode and in expelling mode.

The present invention also aims to provide such an assembly for dispensing a fluid product, which makes it possible to achieve a correct and reproducible spray.

The present invention thus aims for an assembly for dispensing a fluid product comprising a tank intended to contain a fluid product and a piston sliding in said tank, a sampling needle being attached to said tank for drawing a fluid product to be dispensed in said tank, a removable spray head being assembled on said tank, around said sampling needle, to spray said fluid product to be dispensed outside of said tank, said spray head comprising a dispensing port and an insert arranged upstream of said dispensing port, said spray head, when assembled on said tank, is axially movable between a transport position and a use position, said assembly comprising guide means for guiding said spray head when it is assembled in its transport position and/or when it is moved in its use position, first locking means for holding said spray head in its transport position, and second locking means for holding said spray head in its use position.

Advantageously, said sampling needle comprises a cannula part provided with an outlet port and comprising a first part of a larger diameter and a second part of a smaller diameter, forming the tip which comprises said outlet port, said insert comprising a receiving sleeve, receiving said tip when said spray head is assembled on said tank.

Advantageously, in said transport position, said tip formed by said second part of a smaller diameter is arranged inside said receiving sleeve with a space between the external surface of said tip and the internal surface of said receiving sleeve.

Advantageously, in said use position, said first part of a larger diameter is in close contact, in particular sealed, with said receiving sleeve.

Advantageously, in said use position, said second part of a smaller diameter is in close contact with said receiving sleeve.

According to an advantageous embodiment, said spray head comprises at least one internal profile extending radially inwards and said tank comprises second and third external profiles extending radially outwards, axially offset over an external surface of said tank, said at least one internal profile engaging with said second external profiles to form said first locking means defining said transport position and with said third external profiles to form said second locking means defining said use position.

Advantageously, said spray head comprises a plurality of internal profiles, preferably three, distributed over its periphery, and said second and third external profiles of said tank are respectively formed by a peripheral ridge.

Advantageously, said tank comprises first external profiles extending radially outwards, axially offset upwards with respect to said second external profiles, and engaging with said spray head to form said guide means.

In a variant, said sampling needle comprises a radially external wall engaging with said spray head to form said guide means.

According to another advantageous embodiment, said tank comprises a radially projecting lug, said spray head comprising a first and second cutout, diametrically opposite, extending axially upwards from an axially lower edge, said second cutout being larger than said first cutout, such that said first locking means are formed by said lug engaging with said first cutout and said second locking means are formed by said lug engaging with said second cutout.

Advantageously, each cutout ends with a respective clipping zone, wherein said lug is snap-fitted.

Advantageously, said tank and/or said piston comprise(s) dose-fractioning means to separate the fluid product to be dispensed contained in said tank into at least two doses intended to be sprayed during several successive actuations of said assembly.

Advantageously, said dose-fractioning means comprise a lug of said piston sliding in a groove of said tank, said groove comprising a shoulder for locking said lug after spraying of the first dose of fluid product.

Advantageously, said tank and/or said piston comprise(s) energy accumulation means requiring the application of at least one predetermined force to enable the spraying of said fluid product to be dispensed.

Advantageously, said energy accumulation means comprise at least one bottleneck or boss engaging with said lug of said piston, said lug being able to pass beyond said energy accumulation means when at least said predetermined force is applied on said piston.

Advantageously, before actuation, said lug is axially offset from said energy accumulation means, such that at the start of an actuation stroke, said piston performs an air and/or dead volume purge.

These advantages and features and others of the present invention will appear more clearly during the detailed description below, made in reference to the accompanying drawings, given as non-limiting examples, and wherein:

FIG. 1 is a schematic cross-sectional view of a dispensing assembly according to a first advantageous embodiment, with the spray head assembled in the transport position, FIG. 2 is a view similar to that of FIG. 1, in the use position, FIG. 3 is a detailed cross-sectional view of the spray head according to the first embodiment, FIG. 4 is a horizontal cross-sectional view of the spray head along the cutting line A-A in FIG. 3, FIG. 5 is a schematic, perspective view of the insert, FIG. 6 is a schematic, perspective view of the sampling needle according to the first embodiment, FIG. 7 is a schematic, perspective view of the tank according to the first embodiment, FIG. 8 is a schematic, perspective view of the piston, FIG. 9 is a schematic view of the assembly in the transport position, FIG. 10 illustrates the assembly without the spray head, for the sampling phase, FIGS. 11 to 13 show the assembly respectively before dispensing the first dose, after dispensing the first dose and before dispensing the second dose, and after dispensing the second dose, FIG. 14 is a schematic, perspective view of the sampling needle according to a second embodiment, FIG. 15 is a schematic cross-sectional view of a dispensing assembly according to the second embodiment, with the spray head assembled in the transport position, FIG. 16 is a schematic, perspective view of the tank according to a third embodiment, and FIG. 17 is a schematic, perspective view of the spray head according to the third embodiment.

The dispensing assembly comprises a tank 10 of the syringe type and a piston 20 sliding in said tank between a retracted position, which can be seen in FIG. 11, and a pressed position, which is that represented in FIGS. 1, 2, 9, 10, 13 and 15. A sampling needle 30 is attached to the tank 10, and a spray head 40 provided with a dispensing port 41 is removably assembled on said sampling needle 30. The spray head 40 contains a hollow insert 50 arranged upstream of the dispensing port 41. In the sampling phase, the spray head 40 is removed to expose the sampling needle 30 which can thus be inserted in a container containing the fluid product to be drawn into the tank 10 through said sampling needle 30. After this sampling phase, the spray head 40 is put back in place, around said sampling needle, which makes it possible to dispense the fluid product contained in the tank 10 in spray form, for example, for a nasal spray.

According to the invention, the removable spray head 40, when assembled on the tank 10, is axially movable between a transport position and a use position.

The piston 20 comprises a piston element 22 integral with an actuation rod 21 actuated by the user at the time of dispensing, in particular by manually pressing on an end collar 23 of the piston rod 21. The piston element 22 can be made of one part with the piston rod 21, for example, by moulding of a plastic material, or form a separate element, attached, for example overmoulded, to said piston rod. In this case, the piston element 22 can be made of a material different from the piston rod 21.

The tank 10 comprises an upper part 11 intended to receive the fluid product to be dispensed and a lower part 12 intended to engage with the actuation rod 21 of the piston 20. A radial flange 13 forming a finger rest is advantageously provided between said first and second parts 11, 12 of the tank 10.

The upper part 11 of the tank 10 comprises an end part 110 on which the sampling needle 30 is attached, for example by screwing or snap-fitting. This end part 110 can be of a reduced external diameter, as illustrated in FIGS. 1, 2 and 7.

The lower part 12 of the tank 10 comprises at least one groove 15, which each engages with a lug 25 of said piston rod 21. This lug 25 is radially projected outwards and slides in said at least one groove 15 when said dispensing assembly is actuated. Advantageously, two diametrically opposite grooves 15 can be provided, as well as two diametrically opposite lugs 25.

The groove 15 can comprise a shoulder 17 forming dose-fractioning means. In this case, the groove 15 is axially extended by a laterally offset upper groove part 16. Thus, when the piston 20 is actuated in view of spraying the fluid product to be dispensed, the lug 25 of the piston 20 axially slides in a first part of the groove 15, and this lug 25 is stopped by said shoulder 17 of the groove 15. This defines the first dose, by cutting the actuation stroke of the piston 20 in the tank 10. The user must thus, for example, slightly rotate the piston 20 to bring the lug 25 facing the second groove part 16, in order to be able to spray the second dose. Naturally, the invention is also applied to a single-dose device, wherein all of the fluid product to be dispensed is sprayed in one single dose. It can also be applied to devices containing more than two doses, for example, three or four doses.

Advantageously, the groove 15 comprises energy accumulation means, such as, for example, bottlenecks 18, 19, which can engage with the lug 25 at the start of each actuation stroke to impose that the user exerts at least a sufficient force on the piston 20 to overcome the resistance generated by said energy accumulation means. When this force is reached, the lug 25 passes beyond said energy accumulation means, which suddenly releases the energy accumulated in the hand of the user, thus guaranteeing that the actuation stroke, or the actuation half-stroke in the example represented of a bidose, is fully achieved. Naturally, these energy accumulation means can be produced in any suitable manner, and the bottlenecks 18, 19 are only one example of an advantageous embodiment. For example, bosses or breakable bridges can be considered in said groove 15, 16.

Other variants for the dose-fractioning means can be considered, for example, an elastically deformable part formed either on the piston, or on the tank, and which is deformed when a sufficient force is applied on the piston. In this case, the dose-fractioning means could simultaneously form energy accumulation means. Other variants can also be considered.

In the example represented, the sampling needle 30 comprises a cannula part 35 provided with an outlet port 32. An attaching part 31 is provided to attach the sampling needle 30 on the tank 10, in particular, its end part 110, for example by screwing, snap-fitting or any other suitable attaching means. The cannula part 35 advantageously comprises a first part 33 of a larger diameter connected to the attaching part 31 and a second part 34 of a smaller diameter, forming the tip which comprises the outlet port 32.

The spray head 40 comprises a hollow body 42 provided with a bottom wall comprising a spray port 41.

The spray head 40 contains an insert 50 upstream of the spray port 42 to be adapted on the sampling needle 30. This insert is advantageously inserted in an upper sleeve 44 of the spray head 40. The insert 50 advantageously comprises one or more side passages 55 which enable the fluid product to pass from the inside of said insert 50 to the outside. The upper axial end wall 51 of said insert 50 is thus closed, and the external surface of said axial end wall 51 of said insert can form with the bottom wall of the spray head 40, a spray profile, comprising, for example, swirling channels 52 and a spray chamber 53. This spray profile makes it possible to create a good spraying when the fluid product is dispensed through said spray head 40. The spray profile can be formed on the external surface of said end wall 51 of said insert. In a variant, the spray profile can be provided in the bottom wall of said spray head 40, in which case, the external surface of the axial end wall 51 of the insert could be smooth. Preferably, said spray head 40 and said insert 50 are each produced by moulding of a plastic material. Advantageously, the unit formed by the spray head 40 and the insert 50 is produced such as described in document WO2021094683A1.

On the side opposite the upper axial end wall 51, the insert 50 comprises a receiving sleeve 59 intended to receive the tip of the sampling needle 30 when the spray head 40 is assembled on the tank.

As can be seen in FIG. 1, in the transport position, the tip of the needle formed by the second part 34 of a smaller diameter of the cannula part 35 is advantageously arranged inside the receiving sleeve 59 of the insert 50, but with a space between the external surface of the tip 34 and the internal surface of the receiving sleeve 59. Thus, in this transport position, no radial stress is exerted by the insert 50 on the tip 34, but this is protected, all the same, by the receiving sleeve 59. Thus, in case of the assembly accidentally falling, for example during transport, there is no risk of the tip 34 being damaged, even if the spray head 40 undergoes stresses with respect to the tank 10, due to the impact linked to the fall.

When the spray head 40 is axially moved to its use position, as represented in FIG. 2, the cannula part 35 enters more into the receiving sleeve 59, until that first part 33 of the needle advantageously comes into close and sealed contact with said receiving sleeve 59. Advantageously, the diameter of the receiving sleeve 59 decreases in the direction of the dispensing port 41, and it is therefore possible, that in the use position, the tip formed by the second part 34 of the cannula part 35 also comes into close contact with the internal wall of the receiving sleeve 59.

According to the invention, the assembly comprises guide means for guiding said spray head 40 when it is assembled in its transport position and/or when it is moved into its use position, first locking means for holding said spray head 40 in its transport position, and second locking means for holding said spray head 40 in its use position.

FIGS. 1 to 13 illustrate a first advantageous embodiment.

In this first embodiment, the upper part 11 of the tank 10 comprises first, second and third external profiles 111, 112, 113 extending radially outwards, axially offset over the external surface of said upper part 11, and intended to engage with the spray head 40, as will be described in more detail below. Each series of external profiles 111, 112, 113 can comprise one single profile extending over the periphery, for example, in the form of a ridge. In a variant, a plurality of projections distributed over the periphery could be considered for each series of external profiles.

The lower axial edge 43 of the spray head 40 comprises at least one internal profile 45, which extends radially inwards. Advantageously, there is a plurality of internal profiles 45, distributed over the circumference of the lower axial edge 43, for example, three or four. In a variant, one single internal profile extending over the entire circumference is possible.

This at least one internal profile 45 engages when the spray head 40 is assembled on the tank 10 with first, second and/or third external profiles 111, 112, 113.

Thus, when the spray head 40 is assembled on the tank 10, the at least one internal profile 45 first passes over the first external profiles 111, which will mainly act as a guide and as axial alignment of the spray head with respect to the tank. In this first embodiment, the guide means are therefore formed by the first external profiles 111.

For transport and storage, the at least one internal profile 45 passes over the second external profiles 112, but not over the third external profiles 113, as can be seen in FIG. 1. In this first embodiment, the first locking means are therefore formed by the second external profiles 112.

This is only when the device must be used to spray the content of the tank, that the at least one internal profile 45 passes over the third external profiles 113 to be snap-fitted there. In this first embodiment, the second locking means are therefore formed by the third external profiles 113.

In the example represented in FIGS. 1 to 13, there are three internal profiles 45 distributed over the periphery of the spray head 40, as can be seen in FIG. 4. In this case, the first, second and third external profiles 111, 112, 113 of the tank are respectively formed by a peripheral ridge, as can be seen in FIG. 10.

Advantageously, each part forming the dispensing assembly can be made of a specific material, adapted to optimise its properties.

Thus, for example, the spray head 40 can be made of a rigid material, but however having a slight flexibility, such as polypropylene, to enable it to be snap-fitted on the external profiles 111, 112, 113 of the tank 10.

Likewise, the insert 50 can be made of a rigid material, but however having a slight flexibility, such as polypropylene, to enable it to be sealed, on the one hand, with the spray head 40 and, on the other hand, with the sampling needle 30.

The tank 10 can be made of a rigid material and sufficiently translucent, to make it possible for the fluid product to be seen in the tank, but however having a slight flexibility, such as polypropylene, to enable a snap-fitting in the spray head 40 with a limited force in the use position.

Advantageously, the spray head 40, the insert 50 and the tank 10 are made of one same material, preferably polypropylene.

The sampling needle 30 is advantageously made of a material that is sufficiently fluid to moulding, but rigid and unbreakable after cooling to make it possible to effectively pierce, for example, COC, COP, PTCA, PBT or PC.

The piston 20 can be made of a rigid material and with a smooth and sliding surface state, but however having a slight flexibility, such as high-density polyethylene, to make it possible to ensure the sealing with the tank 10 without generating too much force. The rigidity/flexibility compromise is also significant for the assembly of the piston 20 in the tank 10 and for an effective energy accumulation upon each actuation.

FIGS. 9 to 13 partially illustrate the phases of using a dispensing assembly according to the first embodiment such as described above.

As can be seen in FIG. 9, before use, the spray head 40 is removably pre-assembled in its storage and transport position on said spray head 30, wherein the tip of the needle does not undergo stresses while being protected in the receiving sleeve 59 of the insert 50.

The user can thus remove said spray head 40, as illustrated in FIG. 10, to perform the sampling phase, then to put back into the use position, to perform the spray(s). The sampling is performed conventionally by making the piston 20 slide in the tank 10 in extension from said needle 35, thus drawing the fluid from said sampling tank into said tank 10. Optionally, several different fluids can be drawn from several different sampling tanks, to be mixed in the tank 10, before spraying.

The spray head 40 is thus once again assembled around said sampling needle 30, in the use position, as can be seen in FIG. 11.

The fluid product to be dispensed can thus be sprayed through said spray head 40.

Advantageously, before performing the first and/or the second dose, a purge, for example air and/or dead volume purge, can be performed before dispensing. Thus, as can be seen in FIG. 11, at rest, the lug 25 of the piston rod is axially offset from the bottleneck 18. At the start of the actuation stroke, until the lug 25 of the piston rod comes into contact with the bottleneck 18 enabling the energy accumulation, the axial movement of the piston makes it possible to perform this purge.

In this second embodiment, there are no more first external profiles 111 on the tank, and it is the sampling needle 30 which comprises a radially external wall 39 which engages with the inside of the spray head 40 to perform its guiding when it is axially moved.

Figure 1:
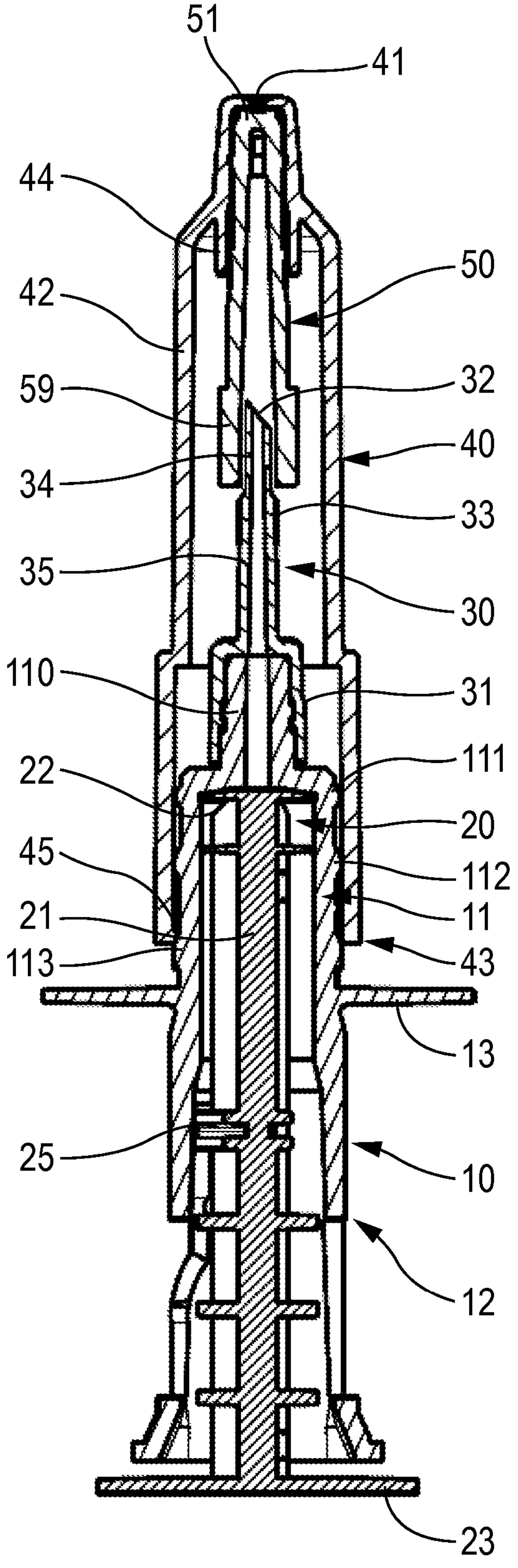
Figure 2:
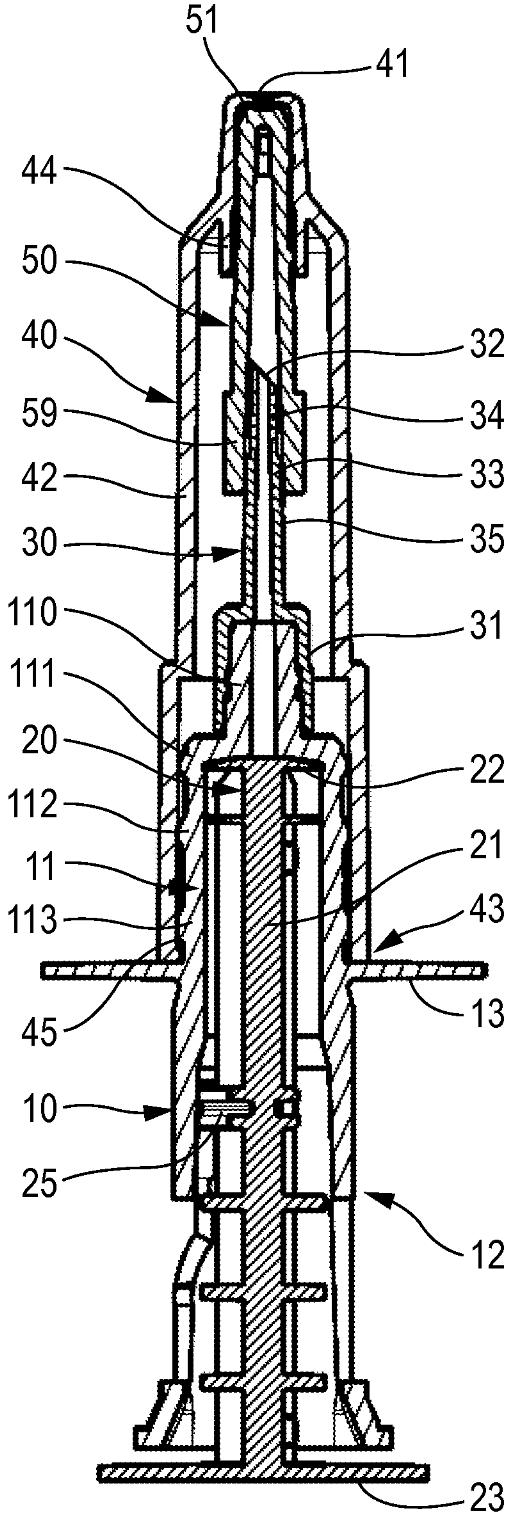
Figure 3:
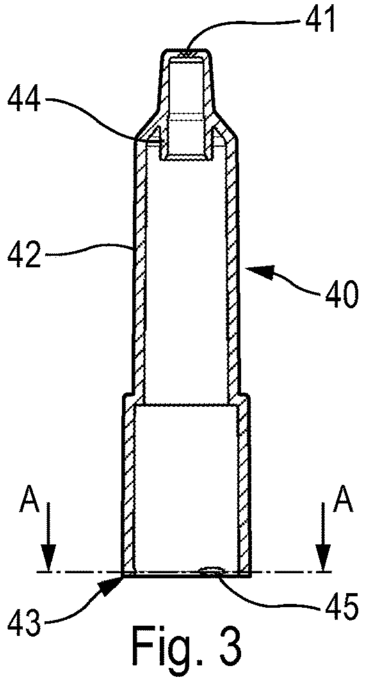
Figure 4:
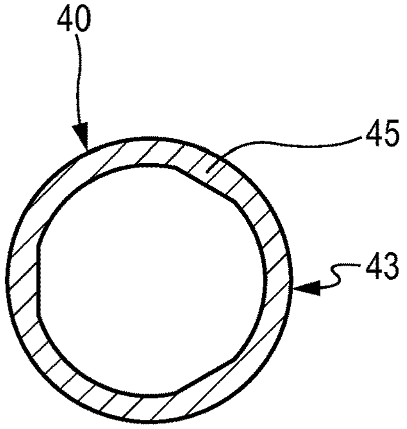
Figure 5:
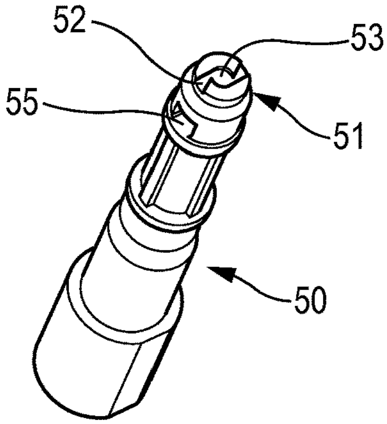
Figure 6:
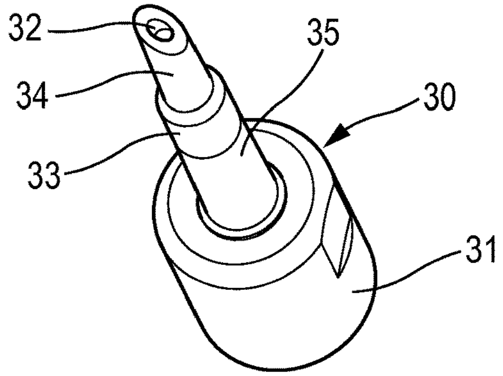
Figure 7:
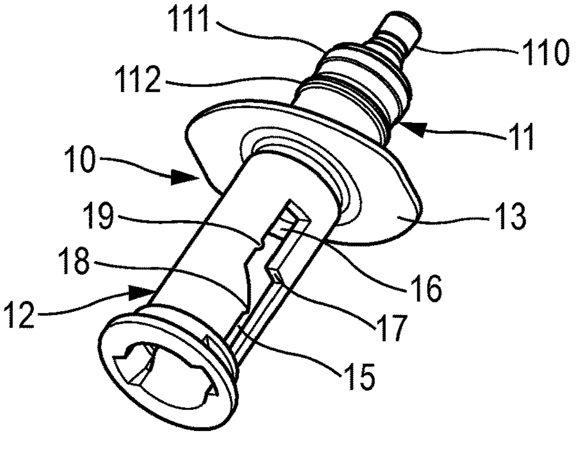
Figure 8:
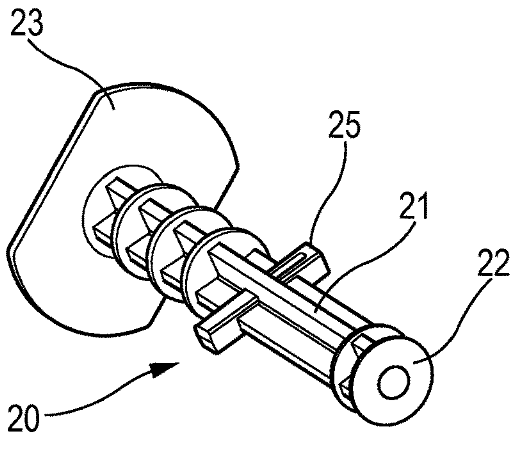
Figure 9:
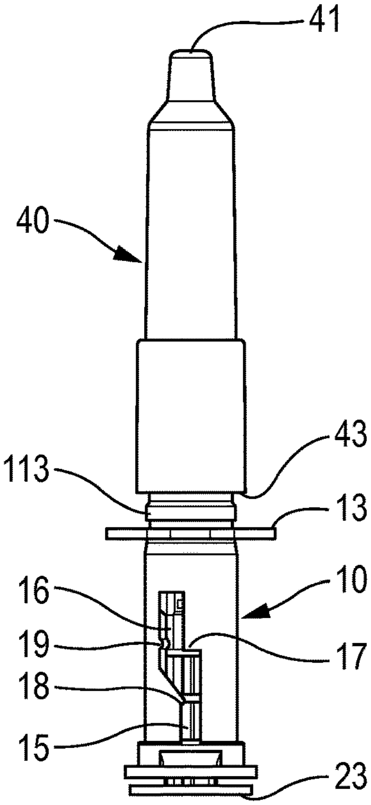
Figure 10:
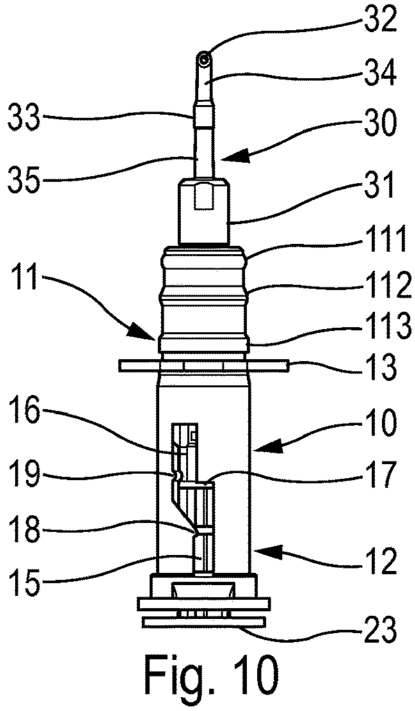
Figure 11:
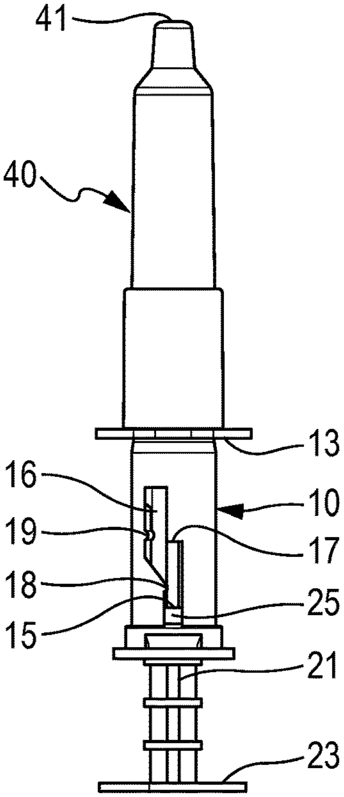
Figure 12:
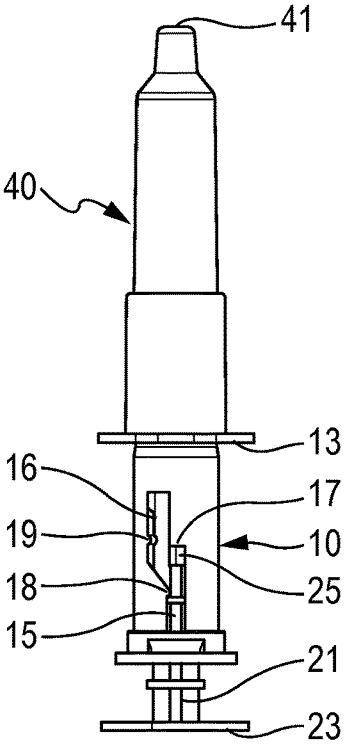
FIG. 12 shows the assembly before dispensing the first dose and FIG. 13 shows the assembly after dispensing the second dose.
Figure 13:
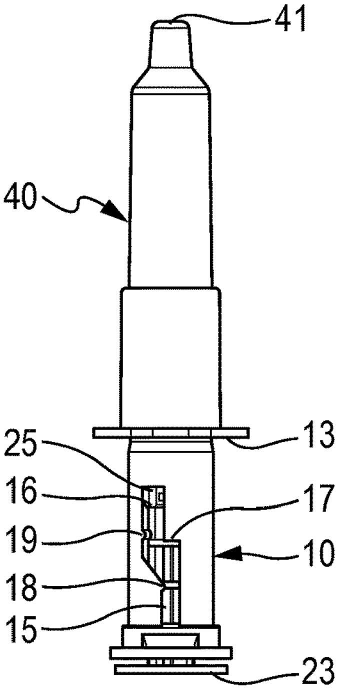
Figure 14:
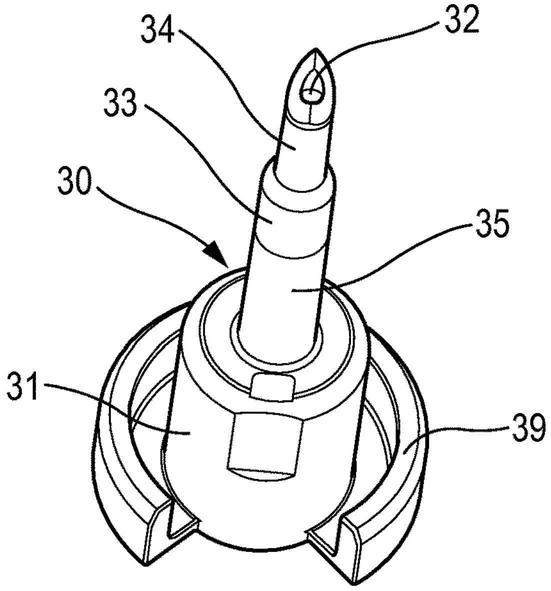
FIGS. 14 and 15 illustrate a second embodiment, which only differs from the first embodiment described above by the guide means.
Figure 15:
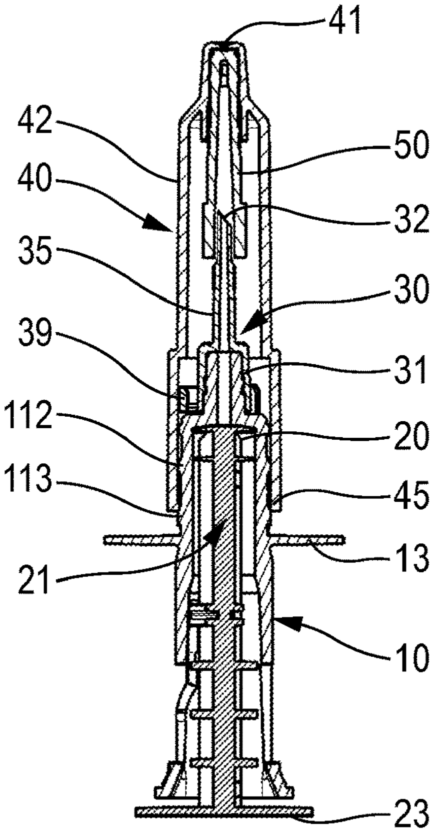
Figure 16:
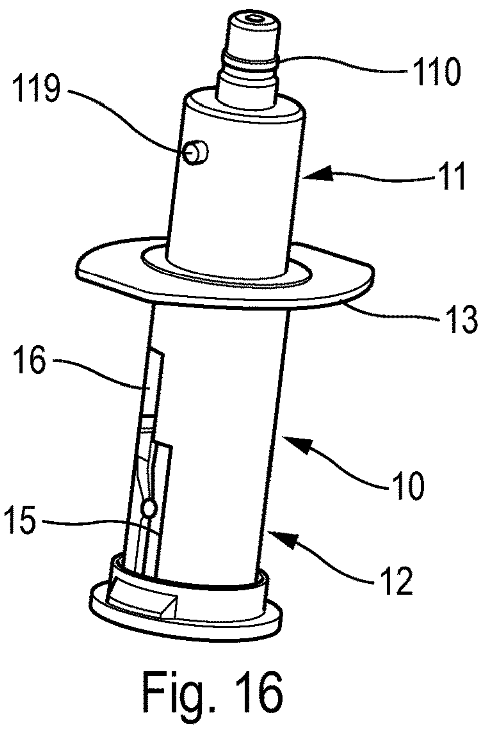
Figure 17:
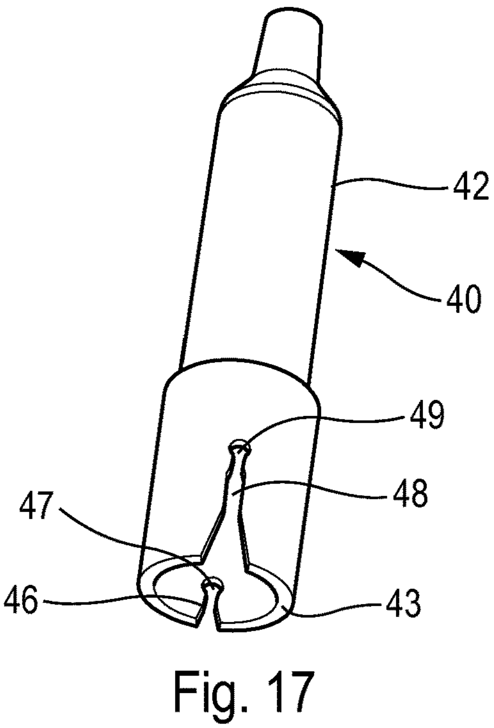

FIGS. 16 and 17 illustrate a third embodiment.

In this third embodiment, the guide means are, like in the second embodiment, formed by the wall 39 of the sampling needle 30.

The difference in this case relates to the first and second locking means.

Thus, the tank 10 comprises, in its upper part 11, a radially projecting lug 119.

The spray head 40 comprises two cutouts 46, 48, diametrically opposite, axially extending upwards from the axially lower edge 43. The second cutout 48 is larger than the first cutout 46. Advantageously, each cutout 46, 48 ends by a clipping zone 47, 49, wherein the lug 119 of the tank can be snap-fitted.

Thus, in the transport position, the lug 119 is clipped in the clipping zone 47 of the first cutout 46.

When the user wishes to use the assembly, in particular in the sampling phase, the spray head 40 will be removed from its transport position.

Then, before using the assembly to dispense the dose(s) of fluid product contained in the tank 10 after the sampling phase, the spray head 40 will be implemented, but this time with the lug 119 of the tank which enters into the second cutout 48 to be clipped in the use position in the clipping zone 49.

Other variants of embodiments for the guide means, the first locking means and the second locking means can be considered.

Although the present invention has been described in reference to several advantageous embodiments of it, it is understood that a person skilled in the art can provide several useful modifications to it, without moving away from the scope of the present invention, such as defined by the accompanying claims.

The invention claimed is:

1. An assembly for dispensing a fluid product comprising a tank intended to contain a fluid product and a piston sliding in said tank, a sampling needle being attached to said tank for drawing a fluid product to be dispensed in said tank, a removable spray head being assembled on said tank, around said sampling needle, to spray said fluid product to be dispensed outside of said tank, said spray head comprising a dispensing port and an insert arranged upstream of said dispensing port, wherein said spray head, when assembled on said tank, is axially movable between a transport position and a use position, said assembly comprising guide means for guiding said spray head when assembled in the transport position and/or when moved into the use position, first locking means for holding said spray head in the transport position, and second locking means for holding said spray head in the use position.

2. The assembly according to claim 1, wherein said sampling needle comprises a cannula part provided with an outlet port and comprising a first part of a larger diameter and a second part of a smaller diameter, forming the tip which comprises said outlet port, said insert comprising a receiving sleeve receiving said tip when said spray head is assembled on said tank.

3. Assembly according to claim 2, wherein, in said transport position, said tip formed by said second part of a smaller diameter is arranged inside said receiving sleeve with a space between the external surface of said tip and the internal surface of said receiving sleeve.

4. Assembly according to claim 2, wherein, in said use position, said first part of a larger diameter is in close contact, with said receiving sleeve.

5. Assembly according to claim 2, wherein, in said use position, said second part of a smaller diameter is in close contact with said receiving sleeve.

6. The assembly according to claim 2, wherein, in said use position, said first part of a larger diameter is sealed contact with said receiving sleeve.

7. Assembly according to claim 1, wherein said spray head comprises at least one internal profile extending radially inwards and said tank comprises second and third external profiles extending radially outwards, axially offset over an external surface of said tank, said at least one internal profile engaging with said second external profiles to form said first locking means defining said transport position and with said third external profiles to form said second locking means defining said use position.

8. Assembly according to claim 7, wherein said spray head comprises a plurality of internal profiles distributed over a periphery of the spray head, and said second and third external profiles of said tank are respectively formed by a peripheral ridge.

9. Assembly according to claim 7, wherein said tank comprises first external profiles extending radially outwards, axially offset upwards with respect to said second external profiles, and engaging with said spray head to form said guide means.

10. Assembly according to claim 7, wherein said sampling needle comprises a radially external wall engaging with said spray head to form said guide means.

11. The assembly according to claim 7, wherein said spray head comprises three internal profiles distributed over a periphery of the spray head, and said second and third external profiles of said tank are respectively formed by a peripheral ridge.

12. Assembly according to claim 1, wherein said tank comprises a radially projecting lug, said spray head comprising a first and a second cutout, diametrically opposite, extending axially upwards from an axially lower edge, said second cutout being larger than said first cutout, such that said first locking means are formed by said lug engaging with said first cutout and said second locking means are formed by said lug engaging with said second cutout.

13. Assembly according to claim 12, where each cutout ends by a respective clipping zone, wherein said lug is snap-fitted.

14. Assembly according to claim 1, wherein said tank and/or said piston comprise(s) dose-fractioning means to separate the fluid product to be dispensed contained in said tank into at least two doses intended to be sprayed during several successive actuations of said assembly.

15. Assembly according to claim 14, wherein said dose-fractioning means comprise a lug of said piston sliding in a groove of said tank, said groove comprising a shoulder for blocking said lug after spraying of the first dose of fluid product.

16. Assembly according to claim 15, wherein said energy accumulation means comprise at least one bottleneck or boss engaging with said lug of said piston, said lug being able to pass beyond said energy accumulation means, when at least said predetermined force is applied on said piston.

17. The assembly according to claim 16, wherein, before actuation, said lug is axially offset from said energy accumulation means, such that at the start of an actuation stroke, said piston performs an air and/or dead volume purge.

18. Assembly according to claim 1, wherein said tank and/or said piston comprise(s) energy accumulation means requiring the application of at least one predetermined force to enable the spraying of said fluid product to be dispensed.

* * * * *